United States Patent [19]

Schefbauer

[11] 4,244,866
[45] Jan. 13, 1981

[54] CALCIUM RESINATES AND INKS

[75] Inventor: Rupert J. Schefbauer, Hasbrouck Heights, N.J.

[73] Assignee: Inmont Corporation, New York, N.Y.

[21] Appl. No.: 947,146

[22] Filed: Sep. 29, 1978

Related U.S. Application Data

[63] Continuation-in-part of Ser. No. 846,749, Oct. 31, 1977, abandoned, which is a continuation-in-part of Ser. No. 713,292, Aug. 11, 1976, abandoned.

[51] Int. Cl.$^3$ .................... C09D 11/06; C09D 11/08; C08L 91/00
[52] U.S. Cl. .................. 260/23.7 C; 106/28; 106/30; 260/23 AR; 260/23 H; 260/23.5 R; 260/23.7 R; 260/27 R; 260/27 BB; 260/DIG. 38
[58] Field of Search ............... 106/28, 30; 260/23 P, 260/23 H, 23 AR, 27 R, 27 BB, 30, 23.5 R, 23.7 C, 23.7 R, DIG. 38

[56] References Cited

U.S. PATENT DOCUMENTS

| | | | |
|---|---|---|---|
| 2,590,655 | 3/1952 | Schmutzger | 260/27 R |
| 2,977,334 | 3/1961 | Zopf et al. | 260/27 R |
| 3,451,890 | 6/1969 | Stump | 260/27 R |
| 3,468,829 | 9/1969 | Yoshioka et al. | 260/27 R |
| 3,533,811 | 10/1970 | Clements et al. | 260/27 R |
| 3,563,937 | 2/1971 | Nickerson | 260/27 R |
| 3,775,381 | 11/1973 | Hayashi et al. | 106/30 |
| 3,937,674 | 2/1976 | Laarkamp | 260/19 UA |
| 3,943,111 | 3/1976 | Fritze et al. | 106/30 |
| 4,028,291 | 6/1977 | Tsughiya et al. | 260/23.7 C |
| 4,056,498 | 11/1977 | Laurito | 260/23.7 C |

*Primary Examiner*—Joseph L. Schofer
*Assistant Examiner*—Herbert J. Lilling
*Attorney, Agent, or Firm*—Michael R. Chipaloski; F. W. Wyman

[57] ABSTRACT

Calcium resinates and printing inks containing the resinates are described. The printing inks consist of a pigment dispersed in a volatile hydrocarbon solution of a resinous binder wherein said binder comprises
(a) limed rosin,
(b) a substantially linear, polymeric, polycarboxylic acid, and
(c) a reactive hydrocarbon resin.

22 Claims, No Drawings

CALCIUM RESINATES AND INKS

This application is a continuation-in-part of Ser. No. 846,749 filed Oct. 31, 1977, which in turn is a continuation-in-part of Ser. No. 713,292 filed Aug. 11, 1976.

The present invention relates to printing inks containing a volatile liquid hydrocarbon solution of (a) limed rosin, (b) a substantially linear, polymeric, polycarboxylic acid or a limed substantially linear, polymeric, polycarboxylic acid, and (c) a reactive hydrocarbon resin, as the ink vehicle or varnish. The invention relates also to the method of making the ink vehicles.

Limed rosin is widely used in inks, coatings, etc., and is prepared by the fusion method or the solution method. The solution method is very desirable when the limed resinate can be made in a solvent that is useful in the ink or coating that is to be prepared. In coatings and inks using hydrocarbons as solvent, it is necessary that the limed rosin be soluble in the commonly used hydrocarbon solvent. In the past it has been impossible to prepare limed rosins, especially limed tall oil rosin, or mixtures of rosin which include tall oil rosin, that are soluble in hydrocarbons when the degree of liming is more than about two-thirds of the amount of lime required to form the di-resinate. Rosin consists predominantly of resinous monocarboxylic acids with only a minor amount of non-acidic material. Tall oil rosin differs from wood and gum rosins in that it contains 2-3% of fatty acids. The rosin acids are monocarboxylic acids of alkyl hydrophenanthrene, e.g. abietic acid. In the liming process the monocarboxylic acids of rosin react with calcium hydroxide to form calcium salts, or resinates. Theoretically, the resinous acids can react to form either calcium di-resinate or basic calcium mono-resinate, i.e. Ca' (resinate) or CA (OH) (resinate). The calcium di-resinate contains approximately 6.2% calcium while the basic calcium monoresinate contains 11.2% calcium. In accordance with prior art processes, it is not possible to incorporate more than about 6 to 7 parts of calcium hydroxide per 100 parts of rosin in a solution liming of rosin, especially tall oil rosin. Assuming complete conversion of lime to di-resinate, this would give a product containing 3.06 to 3.56 calcium. As the percentage of calcium increases, the melting point of the resinate increases, and this is important in the printing ink field, and results in it being desirable to increase the degree of liming in order to obtain the more desirable higher melting resinates. Therefore, there is a need and a desire in the industry for high melting calcium resinates, especially tall oil rosin resinates, that are soluble in hydrocarbon solvents commonly used in printing inks and coatings.

In accordance with the present invention, it is possible to form hydrocarbon soluble calcium resinates by either the solution or fusion method wherein as high as 100% of stoichemetric amount of lime to form di-resinate can be reacted to obtain hydrocarbon soluble resinates. In accordance with one aspect of the invention, tall oil rosin, or mixtures of tall oil rosin with other rosins, is mixed with a substantially linear polymeric, polycarboxylic acid and a reactive hydrocarbon resin, and the mixture is reacted with hydrated lime in solution in hydro carbon solvents. The substantially linear polymeric, polycarboxylic acid is preferably used in an amount which is sufficient to enable at least 75%, preferably 80 to 90%, of the stoichemetric amount of lime to form di-resinates to be combined with the mixture to obtain a soluble product. In general, use of an amount of the polycarboxylic acid which is no more than about 10% of total equivalents of carboxyl is sufficient to obtain hydrocarbon soluble limed rosin products containing 85% of the stoichemetric amount of lime to form the di-resinate.

In the aforementioned embodiment of the invention, in order to obtain soluble resinates containing 75 to 100% of the stoichemetric amount of lime to form the di-resinate, it is preferable to use enough of the polymeric, polycarboxylic acid to contribute 2.5 to 40% of the total carboxyl equivalents of the reaction mixture.

In accordance with the invention, rosin is preferably limed in solution in hydrocarbon solvent in the presence of the polymeric, polycarboxylic acid and a reactive hydrocarbon resin.

Preferably, the polymeric, polycarboxylic acid is a partial ester of a 1.3:1 molar ratio copolymer of a maleic anhydride and α-olfein, wherein 10 to 90%, e.g. 20, 40 or 80%, preferably 50 to 75%, of the carboxyls of the copolymer are esterified with an alcohol, especially an alkanol containing 1 to 18, preferably 3 to 8, carbon atoms, or mixtures thereof. Suitable alcohols include straight and branched chain alcohols such as methyl, ethyl, propyl, isopropyl, butyl, sec. butyl, hexyl, tridecyl, abietyl, benzyl, 2-ethyl hexyl, stearyl, etc. Preferably the α-olefin will contain 8 to 30 carbons.

The reactive hydrocarbon resins are used in small amounts, i.e., about 1 to 25% and preferably from about 10 to about 20% of the total resins in the liming reaction. The reactive hydrocarbon resins that can be used include the reaction product of a polydicyclopentadiene and tall oil. For example, a commercial dicyclopentadiene feedstock such as Dow Chemical's dicyclopentadiene concentrate is first polymerized by heating. Such commercially available dicyclopentadiene feedstock concentrates typically contain a second component such as various codimers. This second component of the feedstock in the reaction mixture is itself a mixture of dimerized conjugated aliphatic, cyclic and non-cyclic dienes of five carbon atoms, e.g. a mixture consisting essentially of dimers of isoprene, cis-piperylene and trans-piperylene and codimers, trimers and cotrimers of iosprene, cis-piperylene, trans-piperylene and cyclopentadiene. More particularly, a typical second component mixture may consist essentially of from about 70 to about 90% dimers of isoprene, cis-piperylene and trans-piperylene and codimers, trimers and cotrimers of isoprene, cis-piperylene, trans-piperylene and cyclopentadiene.

After preparation of the polycyclopentadiene, the resin is then treated with tall oil. The tall oil composition typically utilized is refined tall oil, i.e., crude tall oil which has been refined such as by distillation. The refined tall oil typically consists essentially of a predominate amount of tall oil fatty acids and a lesser amount of tall oil resin acids. For example, the refined tall oil may contain from about 50% to about 70% fatty acids, and from about 30% up to less than about 50% rosin acids. Other tall oil compositions containing, for example, from about 10% to about 90% fatty acids and from about 90% to about 10% rosin acids may also be used. Tall oil and particularly refined or distilled tall oil is well known per se and the manner in which it is produced, derived or obtained is not a part of the present invention. Preferably, the tall oil is present in an amount from about 10 to about 30% by weight of the reaction mixture.

The pressures employed in the reaction zone are not critical, with the pressure sufficient to prevent substantial loss by evaporation of the reactants typically being used. Subatmospheric, atmospheric and superatmospheric pressures may be employed, and autogenous pressure in a substantially sealed reaction vessel is typically convenient.

If desired, inert diluents such as toluene or benzene may also be present in the reaction zone or mixture in an amount, for example, of up to about thirty percent based on the total weight of the reaction mixture including the diluent.

Any conventional reactor vessel may be employed for this polymerization reaction, and the polymerization reaction may be conducted in a batch, semi-continuous or continuous manner. Preferably, the polymerization reaction is carried out under agitation, e.g. in a stirred reactor vessel.

Preferred hydrocarbon resins of this type include Nevroz 1520 which is commercially available from Neville Chemical Co. and Zecoroz 750 available from Ziegler Chemical & Mineral Corporation.

By the process of the invention, resinates that are soluble in hydrocarbon solvents can be obtained. The resinates prepared in accordance with the invention may contain 75 to 100% of the theoretical amount of lime to form the di-resinate; they are high melting and when incorporated into printing inks they provide improved results when printed on paper, i.e., improvement over conventional limed rosin inks. The major improvements over conventional inks are improvement in gloss, adhesion of the ink to the substrate, toughness of ink film and the ink film has better abrasion resistance. Preferably the liming reaction is carried out in the presence of 1 to 4% by weight of urea, based on total weight of rosin(s) or rosin(s), polymeric polycarboxylic acid and reactive hydrocarbon resin, which makes it possible to obtain lower acid numbers and higher viscosities in the limed resinates, both of which are very desirable when the solutions are used in printing inks.

In accordance with another aspect of the invention, improved resinates of rosin, including tall oil rosin, gum rosin, wood rosin, and the like are obtained by carrying out the liming reaction in hydrocarbon solution in the presence of the polymeric, polycarboxylic acid, and reactive hydrocarbon resin(s) as described above. The resulting resinate solutions, when used in printing inks, especially gravure printing inks, have produced inks having improved properties when printed. The inks provide prints having improved film properties. The major improvements in film properties are improvement in gloss, adhesion of the ink to the substrate, toughness of the ink film, and the ink has better abrasion resistance. In limed rosin, inks made by conventional liming of rosin, the art has used ethyl cellulose to improve ink film properties. In accordance with the present invention, the limed rosin prepared in accordance with the invention can be used to prepare ink having good film properties without using ethyl cellulose. Also, the improved resinates of the invention are compatible with ethyl cellulose and, therefore, can be used with ethyl cellulose in inks where it is desirable to do so.

For optimum improvement in film properties of the printing inks, the limed rosin should be made in the presence of a polymeric, polycarboxylic acid, as defined above, wherein preferably 50 to 75% of the carboxyl group in the maleic anhydride/α-olefin copolymer are esterified with an alkanol, especially an alkanol containing 3 to 8 carbon atoms.

Preferably a mixture of rosins are used in preparing the limed rosin having improved film properties. The particular mixtures used being determined by the particular circumstances existing at the time, such as availability, price, and color of the different rosins, and the particular ink application involved. The choice of the particular mixture to use at a particular time is within the skill of the ink formulator.

Advantageously the liming reaction is carried out in a hydrocarbon solvent that is useful in printing inks and coatings, such as Lactol Spirits, Rotosolve, Magie Oil, toluene, xylene, etc. If the resinate is to be used in gravure ink, Lactol Spirits, Rotosolve or toluene are preferred solvents. The reaction is carried out by adding lime, or preferably a mixture of lime and urea, to a solution of the resins at a temperature below about 125° F. and then, after an initial exotherm, heating the mixture at higher temperatures, up to the reflux temperature, until the liming reaction is complete, e.g., until the theoretical amount of water has been driven off, or until no more water can be driven off, or until a clear solution is obtained. The resulting resinate solution is then used in printing inks and coatings.

In general, the resinates prepared in accordance with the above described embodiments of the invention, when separated as solid resinates, have higher melting points than soluble resinates prepared without the polymeric, polycarboxylic acid being present. It is believed that this increased melting point, coupled with the improved solubility of the resinates is largely responsible for the improvements in the inks made from the resinates. The higher melting point of the resinate is due to the increased proportion of calcium hydroxide that can be combined to form the soluble resinate.

Gravure printing inks, especially inks used for publication printing, contain limed rosins of various types as the resin component. Mixtures of light, dark and polymerization types are generally used. However, light rosins, whether gum or tall oil types, do not usually produce clear, homogeneous, products when limed. Also, the limed products do not contribute to increasing the viscosity of the ink vehicle as desired and thus do not promote solvent reduction of the inks to printing viscosity.

Limed rosin prepared in accordance with the invention can be used to replace all of limed rosin used in conventional inks. Advantageously, the limed rosin of the present invention is made using mixtures of tall oil rosin with one or more other types of resins, such as wood rosin, gum rosin, polymerized rosin, etc. In the preferred embodiment of the invention, 25% or more, by weight, of the rosin reactant may consist of non-tall oil rosin. Part of the tall oil rosin may consist of a commerical grade of tall oil, i.e., a liquid product containing substantial amounts of fatty acids, e.g., Unitol R, which is a tall oil composed of 52.3% fatty acids, 40.5% tall oil rosin acids, and 7.2% unsaponifiables. Preferably such tall oil products should constitute no more than 10 or 15% by weight of the total rosin reactant. Another relatively inexpensive rosin material that may be included in small amounts, i.e., no more than 10 to 15% of the total rosin reactant, is a still bottoms rosin residue resulting from the polymerization and distillation of rosin, e.g. Melhi.

In another aspect of the invention, the liming reaction may be carried out in the presence of other non-acidic, non-reactive resins that are soluble in the reaction mixture. Such neutral resins preferably are solid hydrocarbons having a melting point above 125° C. and they may comprise up to about 50% of the total resin content. Such non-acidic, hydrocarbon resins having melting points above 125° C. are readily available, e.g., Velsicol XL 45 hydrocarbon resin.

In accordance with a further embodiment of the invention, printing ink vehicles are made by blending a solution of the polymeric polycarboxylic acid and reactive hydrocarbon resin as described above, with a solution of conventionally limed rosin. In this embodiment good ink properties are obtained when the polymeric polycarboxylic acid constitutes about 3 to 15%, by weight of total weight of limed rosin and polycarboxylic acid; optimum properties are obtained in 3.5 to 7% range. Further modification of this embodiment consists in heating the solution of limed rosin with the solution of polymeric polycarboxylic acid. For instance, a mixture consisting of 90% limed rosin and 10% polymeric polycarboxylic acid (solids basis), when heated for four hours at 208° F., resulted in an appreciable rise in the acid number of the resin mixture and a reduction in the melting point. On the other hand, if 10 parts by weight of water is added to 100 parts of the 90/100 mixture of limed rosin and polycarboxylic acid and refluxing continued for three hours before axeotroping the water over a period of 2½ hours, the acid value of the resulting mixture is substantially unchanged and the melting point is only slightly reduced. Ink varnishes from both of these variations produce good ink in accordance with the invention.

Still another embodiment of the invention consists in preparing the ink varnish from a limed mixture of rosin, polymeric polycarboxylic acid, reactive hydrocarbon resin and non-reactive hydrocarbon resin. By this method a limed product containing 40 to 100% of the theoretical amount of lime using a mixture consisting of 0 to 60% of rosins, 8 to 30% by weight of polymeric polycarboxylic acid and 0 to 30% of reactive hydrocarbon resin with 0 to 25% of non-reactive hydrocarbon resin is preferred; optimum results so far obtained have been at 85% of theoretical lime and a mixture consisting of 40% rosin, 20% polymeric polycarboxylic acid, 20% reactive hydrocarbon resin and 20% non-reactive hydrocarbon resin.

The partial esters of maleic anhydride/α-olefin copolymers that are used in the invention preferably have a carboxyl equivalent weight of 105 to 700 and are readily prepared by esterifying a maleic anhydride/α-olefin copolymer with the desired alcohol or mixture of alcohols, using conventional esterification methods; preferably the esterification is carried out in a solvent. The maleic anhydride/α-olefin copolymers required for the esterification are prepared by conventional method, e.g. using a peroxide catalyst, preferably by solution polymerization. Pure α-olefins, such as 1-octene, 1-decene, etc. can be used, but grades or mixtures containing two or more of the α-olefins are preferred for economic reasons. Suitable mixtures are obtainable, for instance, from Chevron Chemical Co., and Gulf Oil Chemicals Co. These products are represented to contain more than 75% of the n-alpha olefins and no more than 9% of saturated hydrocarbons. Typical analysis of commerical grades of alpha olefins that are operable in the invention are:

Gulf Alpha Olefin Fractions (Available from Gulf Oil Chemical Company)

Gulf Ocetene-1 ($C_8$), 96.1% n-alpha olefins, 98.6% mono-olefins, 1.4% saturated hydrocarbons, 99.4% $C_8$ hydrocarbons.

Gulf Dicene-1 ($C_{10}$), 95.2% n-alpha olefin, 98.6% mono-olefins, 1.4% saturated hydrocarbons, 99.4% $C_{10}$ hydrocarbons.

Gulf Dodecene-1 ($C_{12}$), 94% n-alpha olefin, 98.6% mono-olefins, 1.4% saturated hydrocarbons, 99.3% $C_{12}$ hydrocarbons.

Gulf Tetradecene-1 ($C_{14}$), 93% n-alpha olefin, 98.6% mono-olefins, 1.4% saturated hydrocarbons, 98.9% $C_{14}$ hydrocarbons.

Gulf Hexadecene-1 ($C_{16}$), 92% n-alpha olefin, 98.6% mono-olefins, 1.4% saturated hydrocarbons, 98.5% $C_{16}$ hydrocarbons.

Gulf Octadecene-1 ($C_{18}$), 90.8% n-alpha olefin, 98.6% mono-olefins, 1.4% saturated hydrocarbons, 98% $C_{18}$ hydrocarbons.

Gulf Alpha Olefin Fraction $C_{20}$–$C_{24}$, 1% $C_{18}$ hydrocarbon, 49% $C_{20}$ hydrocarbon, 42% $C_{22}$ hydrocarbons, 8% $C_{24}$ hydrocarbons, less than 0.1% of $C_{26}$ hydrocarbon.

Gulf Alpha Olefin Fraction $C_{24}$–$C_{28}$, 0.3% $C_{22}$ hydrocarbon, 28% $C_{24}$ hydrocarbons, 44% $C_{26}$ hydrocarbons, 20% $C_{28}$ hydrocarbons, 8% $C_{30} \div$ hydrocarbons.

Gulf Alpha Olefin Fraction $C_{22}$–$C_{24}$, 1.8% $C_{20}$ hydrocarbons, 69.8% $C_{22}$ hydrocarbons, 28.4% $C_{24}$ hydrocarbons.

Chevron Alpha Olefins (Available from Chevron Chemical Co., Industrial Chemicals Division)

$C_{15}$–$C_{20}$ Fraction: 5% paraffin hydrocarbons, 5% diolefins, 88% n-alpha olefins, 1% $C_{14}$ hydrocarbons, 17% $C_{15}$ hydrocarbons, 18% $C_{16}$ hydrocarbons, 17% $C_{17}$ hydrocarbons, 15% $C_{19}$ hydrocarbons, 12% $C_{20}$ hydrocarbons, 3% $C_{21}$ hydrocarbons.

$C_{18}$–$C_{20}$ Fraction: 8.9% paraffin hydrocarbon, 3.6% diolefin hydrocarbons, 86.3% n-alpha olefin, 1.4% $C_{17}$ hydrocarbons, 22.6% $C_{18}$ hydrocarbons, 37% $C_{19}$ hydrocarbons, 30% $C_{20}$ hydrocarbons, 9% $C_{21}$ hydrocarbons.

$C_{15}$–$C_{18}$ Fraction: 1.6% paraffin hydrocarbon, 7.7% diolefin hydrocarbons, 91.1% n-alpha olefins, 1.4% $C_{14}$ hydrocarbons, 29.2% $C_{15}$ hydrocarbons, 28.2% $C_{16}$ hydrocarbons, 26.3% $C_{17}$ hydrocarbons, 13.6% $C_{18}$ hydrocarbons, 1.3% $C_{19}$ hydrocarbons.

$C_{11}$–$C_{14}$ Fraction: 0.8% paraffin hydrocarbons, 6.0% diolefins, 88.5% n-alpha olefin, 1.0% $C_{10}$ hydrocarbons, 26.8% $C_{11}$ hydrocarbons, 23.9% $C_{12}$ hydrocarbons, 23.5% $C_{14}$ hydrocarbons, 1.3% $C_{15}$ hydrocarbons.

$C_{10}$–Fraction: 1.7% paraffin hydrocarbons, 5.0% diolefins, 89.8% n-alpha olefin, 4.6% $C_9$ hydrocarbons, 95.2% $C_{10}$ hydrocarbons, 0.2% $C_{11}$ hydrocarbons.

In the following examples which further illustrate the invention, the parts are parts by weight unless otherwise stated.

EXAMPLE 1

A limed rosin solution in accordance with the invention was prepared from the following:

|  | Parts | No. of Equivalents |
|---|---|---|
| Unitol R (Eq. wt. 367) | 4.6 | .0125 |
| Tall Oil Rosin (Eq. wt. 320) | 12.0 | .0375 |
| Wood Rosin (Eq. wt. 400) | 16.0 | .0400 |
| Melhi (Eq. wt. 449) | 4.0 | .0089 |
| ½ Isopropanol Ester of $C_{15}$—$C_{18}$ /α-olefin/maleic Copolymer, 42% Solution Eq. wt. of Solution 585) | 10.42 | .0178 |
| Urea | .80 | |
| Hydrated Lime (Eq. wt. 37) | 3.67 | .0992 |
| Lactol Spirits (boiling range 200 to 223° F.) | 48.51 | |
|  | 100.00 | | by slowly adding the hydrated lime and urea to the other components at a temperature of 120° F., and then, after the initial exotherm of about 20° F., heating at reflux, about 170° to 215° F. for about eight hours, or until the theoretical amount of water of reaction was collected. The resulting solution was clear and homogeneous and useful in formulating printing inks using hydrocarbon solvents to obtain prints having improved gloss, adhesion, abrasion, toughness, etc. in accordance with the invention.

In this example, the half isopropanol ester of the α-olefin/maleic anhydride copolymer constitutes 5%, by weight, of the total reaction mixture; 22.4%, by weight, of the total acidic reactants; and 15.3% of total equivalents of acidic materials. The amount of calcium hydroxide is 85% of stoichemetric amount and about 9 parts per 100 parts of acid resin.

In a similar experiment, except that the 5% by weight of ½ isopropanol ester of α-olefin/maleic copolymer was replaced with the unesterified α-olefin/maleic anhydride copolymer, the reaction product precipitated as a heavy sediment and only 54% of the theoretical amount of water of reaction could be removed. The product was unsuitable for use in printing inks.

EXAMPLE 2

In a manner similar to Example 1, a reaction product was made using 10%, by weight, based on total reaction mixture, of half isopropyl ester of the maleic anhydride/α-olefin copolymer with appropriate adjustments being made in the calcium hydroxide and Lactol Spirits. This resulted in the formation of a clear, high viscosity solution of limed product after removal of 100% of the theoretical amount of water of reaction, the limed product containing 85% of the theoretical amount of lime required to form the di-resinate salt. The reaction product is used in preparing printing inks using hydrocarbon solvents. The amount of calcium hydroxide amounted to about 9.3 parts, by weight, per 100 parts, by weight, of acidic resin.

In a similar experiment to Example 2, except that the partial ester was replaced by an equal weight of the unesterified maleic anhydride/α-olefin copolymer, it was possible to remove only 65% of the theoretical amount of water of reaction and the reaction product contained very heavy sediment that was insoluble in hydrocarbon solvents and, therefore, was unsuitable for use in printing containing hydrocarbon solvents.

EXAMPLE 3

PREPARATION PARTIAL ESTER OF α-OLEFIN/MALEIC ANHYDRIDE COPOLYMER 13.14 parts of maleic anhydride (0.13 moles) and 23.52 parts of $C_{15}$—$C_{18}$ alpha olefin (0.10 moles) were copolymerized in 27.52 parts of toluene using 1.03 parts of p-tertiary butyl perbenzoate and heating at 125° C. for 4 to 5 hours. The resulting copolymer solution was reacted with 8.26 parts of isopropanol (0.137 moles) and 8.94 parts of 2-ethyl hexanol (0.069 moles) using 0.17 parts of p-toluene sulfonic acid as esterification catalyst and heating at 140° C. until the acid number was 138 (solids basis). Dilution to 45% solids with 17.2 parts of methyl ethyl ketone yielded a clear solution of acid number 62, and carboxyl equivalent weight of 900. This solution is referred to below as Partial Ester Solution I.

A limed rosin solution was prepared from

|  | Parts | No. of Equivalents |
|---|---|---|
| Lactol Spirits (as in Example 1) | 42.90 | |
| Wood Rosin | 19.80 | .0495 |
| Tall Oil Rosin | 14.36 | .0449 |
| Polymerized Rosin (Melhi) | 9.58 | .0213 |
| Partial Ester Solution I (45% Solids) | 8.86 | .0098 |
| Urea | .80 | |
| Hydrated Lime | 3.70 | .10 |
|  | 100.00 | | by slowly adding the urea and hydrated lime to the other ingredients at 120° F., and, after the initial exotherm, removing water of reaction by azeotropic distillation, until an acid number of 20 was obtained (39 on solids). The resulting solution was clear, had a viscosity of 2800 cps. at 90° F. and contained 51% solids. The capillary melting point of the 100% solids resin was 171° to 174° C. In this example the amount of lime is 7.76 parts per 100 parts of acidic resin; also the amount of lime is about 80% of the amount required to form calcium di-resinate.

Publication gravure printing inks were prepared from the limed rosin solution of Example 3 as follows:
  Yellow Ink was prepared by ball milling
    37 parts limed rosin solution (above)
    5 parts benzidine yellow pigment
    12 parts clay
    3 parts toluene Lactol Spirits (boiling range 200° to 223° F.),
  and then reducing the dispersion with
    37 parts limed rosin solution (above)
    3 parts Lactol Spirits (boiling range 200° to 223° F.).
  Red Ink—A red printing ink was prepared by ball milling
    38 parts of limed rosin solution (above)
    6 parts barium lithol pigment
    20 parts clay
    3 parts toluene
    9 parts Lactol Spirits (boiling range 200° to 223° F.),
  and then reducing the dispersion with
    24 parts of limed rosin solution (above)
    10 parts Lactol Spirits (boiling range 200° to 223° F.).

Blue Ink—A blue printing ink was prepared by ball milling 30 parts of limed rosin solution (as above)
10 parts iron blue pigment
13 parts clay
3 parts toluene
6 parts Lactol Spirits (boiling range 200° to 223° F.)

and then reducing the dispersion with 31 parts limed rosin solution (as above)
7 parts Lactol Spirits (boiling range 200° to 223° F.)

the yellow, red and blue inks described above were printed on paper using a gravure, multicolor printing press to obtain high gloss multicolor prints, having excellent abrasion resistance, toughness, and adhesion to the paper.

Equally good, or better results are obtained when a mixture of Rotosolve and toluene, e.g. 83% Rotosolve, 17% toluene, is substituted for Lactol Spirits in the varnish and inks of the above example. Rotosole is a commercial hydrocarbon solvent mixture—a boiling range of 230° F. to 271° F.

EXAMPLE 4

A limed tall oil rosin solution which was useful in preparing high gloss printing ink was prepared from

| | Parts | No. of Equivalents |
|---|---|---|
| Unitol NCY (tall oil rosin, Eq. Wt. 320) | 50.00 | .156 |
| Partial Ester Solution (as in Example 3, Eq. Wt. 900) | 21.74 | .024 |
| Hydrated Lime (Eq. Wt. 37) | 6.67 | .180 |
| Urea | .83 | |
| Toluene | 91.66 | | by adding the lime and urea slowly to the other ingredients at 120° F. and then, after the initial exotherm, heating at reflux (about 240° F.) and removing water of reaction until the acid number of the solution (41.7% solids) was 4.85 (11.6 solids basis), and the viscosity at 76° F. was 19,200 centipoises. The melting point of the limed resin was 380°–385° F. (193°–196° C. capillary). The acidic reactants and the lime are used in this example in the stoichiometric ratio to form the di-resinate of the calcium; the weight ratio is 11.2 parts of lime per 100 parts of acidic resin. The resinate solution is useful in preparing printing inks in accordance with the invention.

EXAMPLE 5

A limed tall oil rosin solution was prepared from

| | Parts | No. of Equivalents |
|---|---|---|
| Unitol NCY | 50.00 | .156 |
| Partial Ester Solution (as in Example 3) | 21.74 | .024 |
| Hydrated Lime | 6.80 | .184 |
| Urea | .83 | |
| Toluene | 90.00 | | by adding the lime and urea slowly to the other ingredients at 120° F. and then, after an initial exotherm, heating at reflux (about 240° F.) and removing water of reaction until the acid number of the solution (42.4% solids) was 7.4 (17.5 solids basis) and the viscosity at 76° F. was 4,500 centipoises. The melting point of the limed resin was 350°–358° F. (capillary). The weight ratio of lime to acidic resin is 11.4 parts lime per 100 parts acidic resin. This example illustrates that increasing the ratio of lime above the stoichemetric amount to form the di-resinate greatly affects the viscosity of the resin solution, does not lower the acid rnumber, and tends to lower the melting point of the limed resin. The resin solution obtained is less desirable as a gloss ink component than the solution obtained in Example 4. In this example the ratio of carboxyl/calcium is 1:1.02 on an equivalents basis.

EXAMPLE 6

A limed rosin solution suitable for use as a gravure printing ink varnish was prepared from

| | Parts | No. of Equivalents |
|---|---|---|
| Unitol NCY | 40.00 | .125 |
| Partial Ester Solution I (45%) | 43.48 | .048 |
| Hydrated Lime | 6.41 | .173 |
| Urea | .83 | |
| Toluene | 69.40 | | by slowly adding the lime and urea to the other ingredients at 120° F. and then, after an initial exotherm, heating at reflux (about 240° F.) as in Example 4, to an acid number of 6.7 at 46.4% solid (14 solid basis) and the viscosity was 47,500 centipoises. The melting point of the limed resin was 358°–363° F. (capillary). The ratio of lime to acidic resin by weight is 10.8 parts of lime per 100 parts of acidic resin.

In a similar reaction, except that the urea was not included, the acid number could only be reduced to 9.68 at 47.7% solids (20.3 solids basis). The visosity of the limed resin solution was 20,250 centipoises and the melting point of the limed resin was 340°–345° F. (capillary). This limed resin solution is inferior to those solutions made with urea because it was not possible to reduce the acid number as much as when urea is used and the viscosity was not as high as obtainable. using urea.

EXAMPLE 7

In a series of experiments tall oil rosin was limed at 40% solids, by weight, in toluene, using 0.83% urea, by weight, based on total weight of reaction mixture, by adding lime and urea, as in the previous examples, to a solution of the rosin in toluene and heating up to a reflux temperature of about 240° F.

(a) 50% of the stoichemetric amount of hydrated lime to form the di-resinate gave a clear solution.
(b) At 66⅔% of stoichemetric amount of lime, the solution became pearlescent and hazy.
(c) At 100% of stoichemetric amount of lime, the product precipitated as a heavy sludge.
(d) Using a 90/10 equivalents ratio of tall oil rosin/polymeric, polycarboxylic acid (partial ester solution of Example 3) and 100% of the stoichemetric amount of lime to form the di-resinate of both acidic components, the product precipitated as a sludge.
(e) Substituting a 75/25 ratio of tall oil rosin and polymeric acid in (d) above gave a clear solution.

EXAMPLE 8

In a series of experiments, similar to Example 7, tall oil rosin was limed at 40% solid, by weight, in Lactol Spirits, using 0.83% urea by weight, based on total reaction mixture.

(a) At 50% of the stoichemetric amount of lime to form the di-resinate, the product is a clear solution.

(b) At 66 ⅔% of stoichemetric amount of lime, the product is a pearlescent and hazy solution.

(c) At 100% of stoichemetric amount of lime, the resinate had precipitated as a sludge.

(d) Using a 95/5 equivalents ratio of rosin/polymeric acid (Partial Ester Solution of Example 3), the product was pearlescent and hazy at 75% stoichemetric amount of lime to form di-resinate of both acidic components.

(e) Using a 90/10 ratio in (d) instead of the 95/5 ratio gave a clear product.

(f) At 85% of stoichemetric amount of lime, the 90/10 ratio of lime/polymeric acid (as in E above) gave a product that was hazy.

(g) Using an 85/15 ratio of rosin/polymeric acid in (F) above gave a clear solution.

(h) At 100% of stoichemetric amount of lime using a 75/25 equivalents ratio of rosin/polymeric acid (Partial Ester of Example 3), the product had only a very slight haze and was useful for making printing inks in accordance with the invention.

From Examples 7 and 8, it is clear that a 100% limed product can be obtained by liming a solution of a 75/25 equivalents mixture of rosin and polymeric, polycarboxylic acid. The examples also make it evident that higher percentages of lime can be reacted with mixtures of tall oil rosin and the polymeric, polycarboxylic acid, than with tall rosin alone.

EXAMPLE 9

In a series of experiments tall oil rosin was limed at 40% solids in Lactol Spirits, hydrocarbon solvent in a manner similar to Example 8, using 0.83% urea, by weight, based on total reaction mixture and varying ratios, based on carboxyl equivalents, of Partial Ester Solution I of Example 3, tall oil rosin and varying amounts of hydrated lime.

(a) In Lactol Spirits at 85% of the stoichemetric amount of hydrated lime to form the di-resinate and a ratio of 2 equivalents of Partial Ester Solution 1/1 equivalent of tall oil rosin, a clear, flowable product resulted, having an acid number of 50 (solids basis). The clear solution was useful as a varnish in gravure inks.

(b) Experiment (a) was repeated except that the ratio parts Partial Ester equivalents to tall oil rosin equivalents was changed to 3:1. The resulting product was a clear, flowable solution of the resinate. The resinate solution is useful as a varnish for preparing gravure inks.

(c) Experiment (b) was repeated except that 90% of the stoichemetric amount of hydrated lime was used. The resulting product was gelled, i.e. had a consistency like jello and was not useful as an ink varnish.

(d) Experiment (c) was repeated in toluene as the solvent, but the result was a gel.

(e) Experiment (a) was repeated using a ratio of equivalents of Partial Ester to equivalents of tall oil rosin of 4:1. The resulting product was a gel and unsuitable as an ink varnish.

(f) Experiment (a) was repeated using 80% of the stoichemetric amount of hydrated lime and a ratio of Partial Ester: tall oil rosin of 9:1. The resulting product was a gel and unsuitable for use as an ink varnish.

The above experiments indicate that tall oil rosin must contribute a minimum 25% of the total carboxyl equivalent content to produce non-gelled products with a maximum 85% of stoichemetric lime content.

EXAMPLE 10

A calcium resinate varnish suitable for use in printing inks was prepared from:
16.0 parts Tall Oil Rosin (0.0500 equivalents)
12.9 parts Wood Rosin (0.0323 equivalents)
8.8 parts Melhi Rosin (0.0196 equivalents)
6.7 parts Partial Ester I (0.0074 equivalents)
3.5 parts $Ca(OH)_2$ (0.0946 equivalents)
0.8 parts Urea
51.3 parts Lactol Spirits
in a manner similar to the preceding examples.

The resulting varnish had a solids content of 49%, an acid number of 17 (on solids), and a Brookfield viscosity of 3600–4200 centipoises at 90° F. In this varnish the amount of lime used is 86.5% of the stoichemetric amount required to form a di-resinate of all of the acidic components. The Partial Ester is 6.8% (based on equivalents) of the total acid components; tall oil rosin is 45.7% (based on equivalents) of the total acid components and 49.1% of the total equivalents of rosins. The ratio of total equivalents of rosin to equivalents of partial ester polycarboxylic acid is 13.6:1.

EXAMPLE 11

A calcium resinate varnish was prepared from:

|   |   | Parts |
|---|---|---|
| A. | Tall Oil Rosin | 31.32 |
| B. | Partial Ester Solution (from Example 3) | 21.65 |
| C. | Toluene | 10.51 |
| D. | Petroleum Hydrocarbon Fraction, Boiling range 240 to 265° C., e.g. Magie Oil 470 | 18.92 |
| E. | Lime (Hydrated) | 2.36 |
| F. | Urea | .84 |
| G. | Magie Oil 470 | 11.25 |
| H. | Tridecanol | 3.15 | by dissolving A and B in C plus D, then adding E and F and, when the exotherm subsided, heating at reflux to complete the reaction and azeotropically remove the water of reaction. Finally, toluene is stripped off by heating under light vacuum and the clear varnish obtained is then adjusted to desired viscosity by adding G and H. The small amount of tridecanol solvent improves the rheological properties of the varnish.

A lithographic printing ink was prepared from:

|   |   | Parts |
|---|---|---|
| A. | Calcium Resinate Varnish (above) | 70.0 |
| B. | Terlon #1 | 3.5 |
| C. | Barium Lithol Pigment | 16.0 |
| D. | Polyethylene Wax | 1.5 |
| E. | Magie 470 Oil | 8.0 |
| F. | Tridecanol | 1.0 | by grinding A, B, C and D on a three-roll mill until the pigment was suitably dispersed and then adjusting the viscosity of the dispersion with E and F to an Inkometer reading at 90° F. of 13 to 14 at 1200 R.P.M. The ink was printed using a Web Offset/Heatset type press and dried (i.e. cured) in conventional manner.

Terlon #1 used in the above ink is a conventional pigment wetting agent supplied by Lawter Chemical Co. It is a long oil alkyd.

EXAMPLE 12

A calcium resinate varnish as prepared from:

|   |   | Parts |
|---|---|---|
| A. | Tall Oil Rosin | 14.4 |
| B. | Wood Rosin | 19.8 |
| C. | Melhi Rosin | 9.6 |
| D. | Partial Ester Solution (Example 3) | 8.9 |
| E. | Lactol Spirits | 36.0 |
| F. | Lime (Hydrated) | 3.7 |
| G. | Urea | .8 |
| H. | Lactol Spirits | 6.8 | by dissolving A, B, C, and D in E and adding F and G. When the exotherm subsided, the mixture was heated at reflux to complete the reaction and remove water of reaction by azeotropic distillation. The H was added to give a varnish having a non-volatile content of 51%, and an acid number of 20 (39 on solids).

A gravure printing ink was prepared from:
3,625 parts phthalocyanine blue
11,000 parts clay
1,500 parts ethyl cellulose
4,000 parts wax compound (25% polyethylene type wax in hydrocarbon solvent)
2,000 xylene
19,000 Lactol Spirits (boiling range 200°–223° F.)
58,875 Calcium resin varnish (as prepared above)

EXAMPLE 13

A calcium resinate varnish was prepared from:

|   | Parts | Equivalents |
|---|---|---|
| Lactol Spirits | 57.6 |   |
| Wood Rosin (Eq. wt. 400) | 26.5 | .06625 |
| Melhi (Eq. wt. 623) | 6.6 | .01059 |
| Partial Ester Solution (Eq. wt. 666) | 5.7 | .00856 |
| Ca(OH)$_2$ (Eq. wt. 37) | 2.7 | .07297 |
| Urea | 0.9 |   |
|   | 100.0 |   | in a manner similar to the above examples to obtain a varnish having 35% total non-volatile content, an acid number of 15 and a viscosity of 5,000 centipoises at 90° F. The melting point of the solid resinate was 320° to 325° F. (capillary). The partial ester solution used in the above varnish was 44–45% solution of the half isopropyl ester of the copolymer of 1.3 moles of maleic anhydride and 1 mole of C15–C18 alpha olefin.

The varnish was used to prepare gravure printing inks having improved properties in accordance with the invention. Prints made from the inks had better gloss, adhesion, toughness and abrasion resistance than is obtained using calcium resinates prepared without using the partial reactant.

EXAMPLE 14

A calcium resinate varnish was prepared from:

|   | Parts | Equivalents |
|---|---|---|
| Lactol Spirits | 25.3 |   |
| Gum Rosin (Eq. wt. 333) | 40.0 | .1201 |
| Partial Ester Solution (Eq. wt. 624) | 30.0 | .0481 |
| Ca(OH)$_2$ | 3.6 | .0973 |
| Urea | 1.1 |   |
|   | 100.0 |   | in a manner similar to the above examples to obtain a varnish having 56% total non-volatile content, an acid number of 56 and a viscosity of 2,000 centipoises at 90° F. The melting point of the solid resinates was 305° to 310° F. (capillary). The Partial Ester Solution used in the above varnish is the same as that used in Example 13.

The varnish was used to repare gravure printing inks having improved properties similar to those for the inks of Example 13.

EXAMPLE 15

An ink vehicle containing 43% by weight of a mixture of 93% limed rosin (a mixture of 52.5% wood rosin and 47.5% tall oil rosin) and 7% of the partial ester of Example 1 except that 0.25 moles of 2-ethyl hexanol replaced 0.25 mole of the isopropanol by using an appropriate amount of the Partial Ester Solution and limed rosin solution in Lactol Spirits and mixing in a Red Devil Paint Shaker for 10 minutes to give a vehicle having a Brookfield viscosity of 80 centipoises at 76° F. An ink was formulated from the vehicle as follows:

|   | Parts |
|---|---|
| Ink Vehicle | 24.7 |
| Barium Lithol Pigment | 8.4 |
| Unitol R | .5 |
| Lecithin | .5 |
| Lactol Spirits (as in Example 3) | 10.5 | were ground for 15 minutes in a Quickie Mill, then

|   | Parts |
|---|---|
| Ink Vehicle | 46.4 |
| Lactol Spirits | 9.0 | were added and mixing continued for two minutes. The ink was printed on coated publication stock using a gravure printing press to give strong prints having good gloss.

EXAMPLE 16

An ink similar to that of Example 15 except that it was made from a vehicle containing an 80/20 mixture of limed rosin and partial ester gave prints that were weak and had poor gloss.

EXAMPLE 17

An ink similar to that of Example 15 except that it was made from a vehicle containing a 96.5/3.5 mixture of limed rosin and partial ester gave prints that were strong and had good gloss.

EXAMPLE 18

A mixture of 72 parts of rosin (mixture 52.5% wood rosin and 47.5% tall oil rosin), 19.1 parts the Partial Ester Solution of Example 15, 7.3 parts of hydrated lime (85% of theoretical) and 1.6 parts of urea was heated until all of the solvents were removed and the theoretical amount of water (3.6 parts) was removed. The final fusion reaction temperature reached 405° F. (207° C.). The resulting limed rosin product had an acid number of 41 and a capillary melting point of 265°–270° F. (129.5°–132° C.). An ink vehicle was made consisting of a H6% solution of the limed rosin product in Lactol Spirits (as in Example 3). An ink in accordance with the invention was made from

|  | Parts |
|---|---|
| Ink Vehicle | 71.1 |
| Barium Lithol | 8.4 |
| Unitol R (Wetting Agent) | .5 |
| Lecithin (Wetting Agent) | .5 |
| Lactol Spirits (as in Example 3) | 19.5 |
|  | 100.0 |

The ink was printed using a gravure press on both gloss and supplement stock. The resulting ink could be printed on both gloss stock and supplement stock. The prints were strong and had good gloss.

EXAMPLE 19

A limed rosin product was made by the fusion procedure of Example 18 from 80 parts or rosin (mixture of 52.5% wood rosin and 47.5% tall oil rosin), 47.5 parts of the Partial Ester Solution of Example 15 and 85% of the theoretical lime. The limed product had an acid number of 28.4 and a melting point of 268°–274° F. (131°–134.4° C.). A printing ink vehicle was made by dissolving 60 parts of the limed product in 40 parts of toluene. An ink was produced from

|  | Parts |
|---|---|
| Ink Vehicle | 66.2 |
| Barium Lithol Pigment | 8.4 |
| Unitol R | .5 |
| Lecithin | .5 |
| Toluene | 24.4 |

The ink could be printed by gravure on both gloss stock and supplement stock. The prints were inferior in gloss to the prints obtained in Example 18; in addition, the prints on gloss stock were streaky while the prints on supplement stock were weaker than those of Example 18 and penetration of ink into the paper was greater.

EXAMPLE 20

A limed rosin solution was prepared from

|  | Parts | No. of Equivalents |
|---|---|---|
| Lactol Spirits (as in Example 1) | 37.70 |  |
| Tall Oil Rosin | 18.90 | .0591 |
| Partial Ester Solution I (45% Solids) | 21.00 | .0233 |
| Zecoroz 750 (Eq. Wt. 3117) (Reactive) | 9.50 | .0030 |
| Polyvel G115 (Non-reactive) | 9.50 |  |
| Urea | .70 |  |
| Hydrated Lime | 2.70 | .0729 |
|  | 100.00 |  | by slowly adding urea and hydrated lime to the other ingredients at 120° F., and, after the initial exotherm, removing water of reaction by azeotropic distillation, until an acid number of 14 (25 on solids) was obtained. The resulting solution had a viscosity of 6200 cps at 90° F. and contained 54% solids. The capillary melt point of the solid resin was 146°–149° C.

EXAMPLE 21

A limed rosin solution was prepared from

|  | Parts | No. of Equivalents |
|---|---|---|
| Lactol Spirits (as in Example 1) | 39.33 |  |
| Tall Oil Rosin | 20.00 | .0625 |
| Polymerized Rosin (Melhi) | 8.80 | .0196 |
| Partial Ester Solution I (45% Solids) | 11.00 | .0122 |
| Zecorez 750 (Eq. Wt. 3117) (Reactive) | 10.00 | .0032 |
| Polyvel G115 (Non-reactive) | 7.00 |  |
| Urea | .80 |  |
| Hydrated Lime | 3.07 | .08297 |
|  | 100.00 |  | by slowly adding urea and hydrated lime to the other ingredients at 120° F., and, after the initial exotherm, removing water of reaction by azeotropic distillation, until an acid number of 12.0 (22.3 on solids) was obtained. The resulting solution had a viscosity of 7300 cps. at 90° F. and contained 54% solids. The capillary melt point of the solid resin was 152° to 155° C.

In the above description of the invention and in the examples the parts are by weight unless otherwise stated.

I claim:

1. A printing ink consisting of pigment dispersed in a vehicle consisting of a volatile hydrocarbon solution of a resinous binder wherein said binder comprises
   (1) a reaction product of rosin and calcium hydroxide, and
   (2) a minor amount of a substantially linear, polymeric, polycarboxylic acid or its reaction product with calcium hydroxide, wherein said polycarboxylic acid is the partial alkyl or aralkyl ester of a 1.3:1 maleic anhydride/α-olefin copolymer wherein the said alkyl and aralkyl group contains 1 to 18 carbon atoms, said α-olefin contains 8 to 30 carbon atoms, and 10 to 90% of the carboxylic group of said polycarboxylic acid are esterified, and wherein the polymeric polycarboxylic acid contributes 2.5 to 40% of the total carboxylic equivalents of the rosin and polycarboxylic acid and the amount of calcium is equal to 40 to 100% of the stoichemetric amount to form the calcium diresinate of all of the carboxyl groups.

2. A printing ink as claimed in claim 1 wherein the resinous binder comprises (1) a reaction product of rosin and calcium hydroxide and (2) a minor amount of the substantially linear, polymeric polycarboxylic acid.

3. A printing ink as claimed in claim 2 wherein the polymeric polycarboxylic acid has been reacted with calcium hydroxide.

4. A printing ink as in claim 1 wherein the resinous binder contains a reactive polycyclopentadiene-tall oil resin.

5. A printing ink as in claim 4 wherein the binder additionally contains a non-reactive hydrocarbon resin.

6. A printing ink as in claim 5 wherein the reaction product is formed by fusion.

7. A printing ink consisting of pigment dispersed in a varnish comprised of a solution of calcium resinate in hydrocarbon solvent wherein said calcium resinate solution is prepared by (a) adding calcium hydroxide to a solution, having a boiling point in the range of 170° F. to 400° F., of rosin, a substantially linear, polymeric, polycarboxylic acid and a reactive hydrocarbon resin in liquid hydrocarbon solvent, said addition of calcium hydroxide being made at a temperature below about 125° F., and (b) heating the mixture at a temperature of up to the reflux temperature of the mixture to speed up the reaction and remove water of reaction, wherein said substantially linear, polymeric, polycarboxylic acid is the partial alkyl or aralkyl ester of a 1.3:1 maleic anhydride/α-olefin copolymer wherein the alkyl or aralkyl group of the partial ester contains 1 to 18 carbon atoms and the/α-olefin contains 8 to 30 carbon atoms and 10 to 90% of the carboxyl groups are esterified, and wherein the polymeric, polycarboxylic acid contributes 2.5 to 40 percent of the total carboxyl equivalents of the reaction mixture and the amount of calcium hydroxide is equal to 40 to 100% of the stoichemetric amount to form the calcium di-resinate and said reactive hydrocarbon resin is a polycyclopentadiene-tall oil resin.

8. A printing ink as in claim 7 wherein the calcium resinate solution is prepared in the presence of 1 to 4% by weight of urea, based on total acidic reactants.

9. A printing ink as in claim 7 wherein 50 to 75% of the carboxyl groups of the maleic anhydride/α-olefin copolymer are esterified.

10. A printing ink as in claim 7 wherein the calcium resinate solution is made using a mixture of tall oil rosin and non-tall oil rosin reactants where the tall oil rosin constitutes at least 25% of the total equivalents of rosin reactants.

11. A printing ink as in claim 7 wherein the calcium resinate solution is prepared in the presence of non-reactive hydrocarbon resin having a melting point of at least 125° C. and is present in an amount no more than equal the total weight of rosin and polymeric, polycarboxylic acid and reactive hydrocarbon resin.

12. A printing ink as in claim 7 wherein the linear polymeric, polycarboxylic acid is the half isopropyl ester of the maleic anhydride/α-olefin copolymer.

13. A printing ink as in claim 7 wherein a mixture of rosins, including tall oil rosin, is used to make the resinate.

14. A printing ink as in claim 7 wherein 80% to 90% of the theoretical amount of lime to form the di-resinate of all acidic components is used.

15. A method of preparing calcium resinate by reacting calcium hydroxide with a solution comprising:

(a) adding calcium hydroxide to a solution, having a boiling point in the range of 170° F. to 400° F., of rosin, reactive hydrocarbon resin and substantially linear, polymeric, polycarboxylic acid in liquid hydrocarbon solvent, said addition of calcium hydroxide being made at a temperature below about 125° F. and (b) heating the mixture at a temperature of up to the reflux temperature of the mixture to speed up the reaction and remove water of reaction, wherein said substantially linear, polymeric, polycarboxylic acid is the partial alkyl or aralkyl ester of a 1.3:1 maleic anhydride/α-olefin copolymer wherein the alkyl or aralkyl group of the partial ester contains 1 to 18 carbon atoms and the α-olefin contains 8 to 30 carbon atoms and 10 to 90% of the carboxyl groups are esterified, and wherein the polymeric, polycarboxylic acid contributes 2.5 to 40 percent of the total carboxyl equivalents of the reaction mixture and the amount of calcium hydroxide is equal to 40 to 100% of the stoichemetric amount to form the calcium di-resinate and said reactive hydrocarbon resin is a polycyclopentadiene-tall oil resin.

16. A method as in claim 15 wherein the polymeric, polycarboxylic acid has a carboxyl equivalent weight of between about 105 and 700.

17. A method as in claim 15 wherein the polymeric, polycarboxylic acid is the product obtained by esterifying the polycarboxylic anhydride with a $C_1$ to $C_{18}$ alkanol.

18. A method as in claim 15 wherein 1 to 4%, by weight, based on total acidic reactants, of urea is used.

19. A method as in claim 15 wherein at least 25% of the equivalents of rosin are tall oil rosins.

20. A method as in claim 15 wherein the solution of rosin, reactive hydrocarbon resin and polymeric, polycarboxylic acid also contains non-reactive hydrocarbon resin in an amount no more than equal the weight of rosin, reactive hydrocarbon resin and polymeric, polycarboxylic acid.

21. A method as in claim 15 wherein the polymeric, polycarboxylic acid is the 50 to 75% partial ester of the said maleic anhydride/α-olefin copolymer.

22. A method as in claim 15 wherein the amount of calcium hydroxide is equal to 80 to 90% of the stoichemetric amount to form the calcium di-resinate, and 50 to 75% of the carboxyl groups of maleic anhydride/α-olefin copolymer are esterified.

* * * * *